(12) United States Patent
Tsukagoshi et al.

(10) Patent No.: US 7,103,100 B1
(45) Date of Patent: Sep. 5, 2006

(54) DIGITAL SIGNAL PROCESSING APPARATUS AND METHOD AND PROVIDING MEDIUM

(75) Inventors: Ikuo Tsukagoshi, Tokyo (JP); Tsutomu Inui, Chiba (JP); Masahito Yamane, Chiba (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/674,887

(22) PCT Filed: Mar. 8, 2000

(86) PCT No.: PCT/JP00/01384

§ 371 (c)(1),
(2), (4) Date: Jan. 30, 2001

(87) PCT Pub. No.: WO00/54509

PCT Pub. Date: Sep. 14, 2000

(30) Foreign Application Priority Data

Mar. 8, 1999 (JP) .................................. 11-060316
Jun. 18, 1999 (JP) .................................. 11-172013

(51) Int. Cl.
*H04B 1/66* (2006.01)
*H04N 7/12* (2006.01)

(52) U.S. Cl. .................................................. 375/240.12

(58) Field of Classification Search ........... 375/240.75, 375/240.12, 240.15, 240.16; 348/415.1, 348/402.1; 382/232, 233, 238; H04N 7/12
See application file for complete search history.

(56) References Cited

U.S. PATENT DOCUMENTS

| | | | | |
|---|---|---|---|---|
| 5,936,670 | A * | 8/1999 | Frencken ................ | 375/240.14 |
| 6,008,849 | A * | 12/1999 | Frencken ................ | 375/240.12 |
| 6,201,536 | B1 * | 3/2001 | Hendricks et al. ........... | 715/716 |
| 6,229,852 | B1 * | 5/2001 | Hoang .................... | 375/240.25 |
| 6,275,535 | B1 * | 8/2001 | Bramley et al. ........ | 375/240.25 |
| 6,320,909 | B1 * | 11/2001 | Takabatake et al. ... | 375/240.25 |

(Continued)

FOREIGN PATENT DOCUMENTS

JP     3-154490     7/1991

(Continued)

*Primary Examiner*—Nhon Diep
(74) *Attorney, Agent, or Firm*—Lerner, David, Littenberg, Krumholz & Mentlik, LLP (57) ABSTRACT

In case of decoding by a software process, in the process 1, video data of a decoded frame corresponding to a management ID stored at the head of an output FIFO 4 at its time point is read out and outputted. In the process 2, audio data is decoded. In the process 3, the video data is decoded. The decoded video data is stored in a video frame buffer and its management ID is stored in the output FIFO 4 in the outputting order. When the process 3 cannot be finished, the process 3 is interrupted during the process and the image of the frame stored at the head of the output FIFO 4 is outputted. After that, when the process 2 is finished, the decoding process of the process 3 which was temporarily interrupted is restarted. In case of performing the encoding by the software process, an encoding amount of the video data as a processing target of the encoding is predicted. Subsequently, whether an empty capacity enough to store the data of the predicted encoding amount exists in a code buffer or not is discriminated. If it is determined that there is the empty capacity, the encoding is started and the video data in which the encoding was finished is deleted from the video frame buffer. The encoding is temporarily interrupted when a reading process or the like of the video data is performed.

6 Claims, 10 Drawing Sheets

U.S. PATENT DOCUMENTS

| | | | |
|---|---|---|---|
| 6,339,669 B1 * | 1/2002 | Taniguchi | 386/68 |
| 6,490,058 B1 * | 12/2002 | Takabatake et al. | 358/442 |
| 6,567,556 B1 * | 5/2003 | Bramley | 382/233 |

FOREIGN PATENT DOCUMENTS

| | | |
|---|---|---|
| JP | 4-326281 | 11/1992 |
| JP | 6-54320 | 2/1994 |
| JP | 8-9383 | 1/1996 |
| JP | 9-205651 | 8/1997 |
| JP | 10-210484 | 8/1998 |

* cited by examiner

ENCODING APPARATUS 10

Fig. 8

13 VIDEO FRAME BUFFER

DIGITAL SIGNAL PROCESSING APPARATUS AND METHOD AND PROVIDING MEDIUM

TECHNICAL FIELD

The invention relates to digital signal processing apparatus and method and providing medium. More particularly, the invention relates to digital signal processing apparatus and method for encoding or decoding video data and audio data by a software process and relates to a providing medium.

BACKGROUND ART

In recent years, a system for transmitting digital video data and digital audio data of a TV program through a satellite has been being spread. In such a system, to compress a data amount, the digital video data and digital audio data are encoded by, for example, an MPEG (Moving Picture Experts Group) system and transmitted.

In an encoding apparatus by a software process, an encoding is performed synchronously with an input period of video data. The input period has been defined by various standards. For example, in the NTSC (National Television System Committee) system, it is set to 33.36 msec. The maximum processing time (encoding time) allocated to one image is restricted by the input period of the video data which has been determined by such a standard. In other words, the inputted video data has to be encoded and the process has to be finished within the input period. The video data encoded in this manner is recorded to a predetermined recording medium or the like or transmitted through a satellite.

A receiving apparatus for receiving digital data transmitted through the satellite decodes received data by the MPEG system. In case of decoding the digital video data by a software process, it is necessary to successively execute a plurality of processes which are necessary for decoding. To output in a real-time manner, it is necessary to complete all of the processes necessary for decoding within a time which is matched with a period that is required for output. For example, in case of the NTSC system, since a frame rate is equal to 30 frames/sec, one period is equal to 33.36 msec. It is, therefore, necessary to decode the digital video data of one frame within 33.36 msec.

In dependence on a situation of a stream which is inputted or a situation of a video image which is decoded, a time necessary for executing those processes fluctuates. For example, in case of a video image of the MPEG system, a time necessary for a decoding process of a variable length code changes depending on a bit rate of a bit stream. A processing time of a motion compensation also changes depending on a kind of picture coding type such as I picture, B picture, or P picture or depending on a difference of motion compensation precision such as half pel or full pel. Further, it also takes time to perform a process such as decoding or demultiplexing of the digital audio data as well as the video image. Further, a time which is consumed by the OS for managing the whole processes also fluctuates.

Therefore, in case of decoding by the software process by using a personal computer, when the decoding process cannot be performed within an output period, the process of a part of data is skipped and an output is decimated, thereby maintaining real-time performance.

As mentioned above, according to the conventional encoding apparatus, since the encoding is performed synchronously with the input period of the video data, the encoding has to be completed at the maximum precision within the input period for each image. The precision upon encoding depends on a similarity between the image before encoding and the image obtained by decoding the encoded image. The precision also depends on the processing time for encoding, encoding method, or the like.

In the case where the encoding process is changed on the time base (for example, MPEG (Moving Picture Experts Group) 2) or in the case where each image has to be encoded at the closest precision as possible (to prevent a situation such that when the precision of the encoding differs on the time base, the decoded image flickers and becomes hard to be seen), an encoding apparatus has to be designed by setting it so that there is an enough time for the encoding process in order to raise the encoding-precision.

The encoding apparatus by the software process has to perform a control of an input, an output, and the like of the video data in addition to the encoding process, and those processes have to be simultaneously performed by a built-in processor. There is, consequently, a problem such that it is difficult to calculate the longest processing time which is allocated to the encoding process due to a relation with the processes other than the encoding process. Thus, there is also a problem such that a vain time during which the processor executes no process is caused. As mentioned above, in case of allowing one processor to perform a plurality of processes, there is a problem such that the processor needs to have a high processing ability and the costs rise.

The invention is made in consideration of such a situation and it is an object of the invention to enable encoding at high precision to be performed even by a processor of a low processing ability by allowing an encoding process of one image to be executed while preferentially executing other processes.

For example, in a dedicated receiving apparatus for receiving a satellite broadcasting, even in case of decoding a reception signal by a software process, the process for decimating an output by skipping a process of a part of data in order to maintain real-time performance should not be permitted in consideration of the fact that such an apparatus is a dedicated apparatus for decoding a digital video signal which is inherently transmitted through a satellite.

In order to enable the decoding to be completed in a short time by the software process, therefore, there are problems such that a processor having a very high processing ability is necessary and the costs are high.

The invention is made in consideration of such a situation and intends to enable a decoding process to be performed at low costs by a software process by using a processor having an ordinary processing ability.

DISCLOSURE OF INVENTION

According to claim 1, there is provided a digital signal processing apparatus comprising: input means for inputting an encoded digital signal; decoding means constructed by software for decoding the digital signal inputted by the input means; first storing means for storing the digital signal decoded by the decoding means by an amount corresponding to a plurality of access units; and managing means for managing an outputting order of the digital signal of the access units stored in the first storing means by an FIFO format.

According to claim 3, there is provided a digital signal processing method comprising: an input step of inputting an encoded digital signal; a decoding step of decoding the digital signal inputted by a process in the input step by software; a first storing step of storing the digital signal decoded by a process in the decoding step by an amount corresponding to a plurality of access units; and a managing step of managing an outputting order of the digital signal of the access units stored by a process in the first storing step by an FIFO format.

According to claim 4, there is provided a providing medium for providing a computer-readable program for allowing a digital signal processing apparatus to execute processes, wherein the processes comprise: an input step of inputting an encoded digital signal; a decoding step of decoding the digital signal inputted by a process in the input step by software; a first storing step of storing the digital signal decoded by a process in the decoding step by an amount corresponding to a plurality of access units; and a managing step of managing an outputting order of the digital signal of the access units stored by a process in the first storing step by an FIFO format.

According to claim 5, there is provided a digital signal processing apparatus comprising: input means for inputting video data; first storing means for storing the video data inputted by the input means; predicting means for predicting a data amount at the time when the video data stored in the first storing means is encoded; encoding means for encoding the video data stored by the first storing means; and second storing means for storing the video data encoded by the encoding means, wherein the encoding by the encoding means is executed if it is determined that the data of the amount predicted by the predicting means can be stored in the second storing means, and the encoding is interrupted while the video data is being inputted by the input means and is being processed.

According to claim 6, there is provided a digital signal processing method comprising: an input step of inputting video data; a first storing step of storing the video data inputted by the input step; a predicting step of predicting a data amount at the time when the video data stored in the first storing step is encoded; an encoding step of encoding the video data stored by the first storing step; and a second storing step of storing the video data encoded by the encoding step, wherein the encoding in the encoding step is executed in the case where the data of the amount predicted by the predicting step can be stored by a process in the second storing step, and the encoding is interrupted while the video data is being inputted by the input step and being processed.

According to another embodiment of the invention, there is provided a program for a medium, wherein the program comprises: an input step of inputting video data; a first storing step of storing the video data inputted by the input step; a predicting step of predicting a data amount at the time when the video data stored in the first storing step is encoded; an encoding step of encoding the video data stored by the first storing step; and a second storing step of storing the video data encoded by the encoding step, and the encoding in the encoding step is executed if it is determined that the data of the amount predicted by the predicting step can be stored by a process in the second storing step, and the encoding is interrupted while the video data is being inputted by the input step and being processed.

In the digital signal processing apparatus according to claim 1, the digital signal processing method according to claim 3, and the providing medium according to claim 4, the stored outputting order of the digital signal of the access units is managed by the FIFO format.

In the digital signal processing apparatus according to claim 5, the digital signal processing method according to claim 6, and the medium according to another embodiment of the invention, the data amount at the time when the inputted video data is encoded is predicted, the video data is encoded, the encoded video data is stored, the encoding is performed when it is determined that the data of the predicted amount can be stored, and the encoding is interrupted while the video data is being inputted and processed.

BEST MODE FOR CARRYING OUT THE INVENTION

Figure 1:
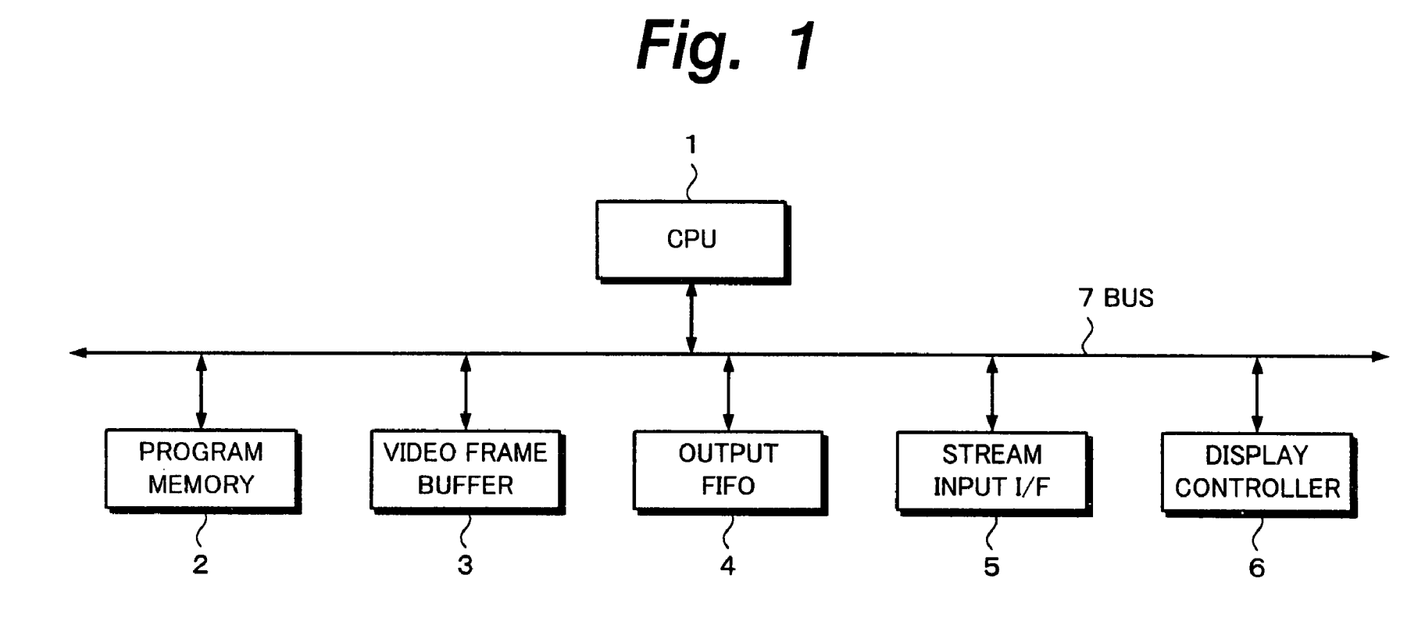
FIG. 1 is a block diagram showing a constructional example of a digital signal processing apparatus (decoder) to which the invention is applied.

A digital signal processing apparatus for decoding by a software process will be first described. FIG. 1 shows a constructional example of a digital signal processing apparatus to which the invention is applied. A decoding program for performing a decoding process of an inputted stream, a processing program for controlling each section, and the like have been stored in a program memory 2. A CPU 1 properly reads out the program stored in the program memory 2 through a bus 7 and executes it. A video frame buffer 3 is a storing apparatus for temporarily storing decoded video data and has a capacity to hold video data of a plurality of frames.

An output FIFO (First In First Out) 4 stores management IDs of buffers 1 to N in which images of frames to be outputted have been stored in the outputting order. A stream input interface (I/F) 5 executes an interface process for inputting a transport stream which is transmitted through a satellite or the like and has been encoded by, for example, the MPEG system. A display controller 6 executes a process for outputting the decoded video data to a display (not shown) and displaying it.

Figure 2:
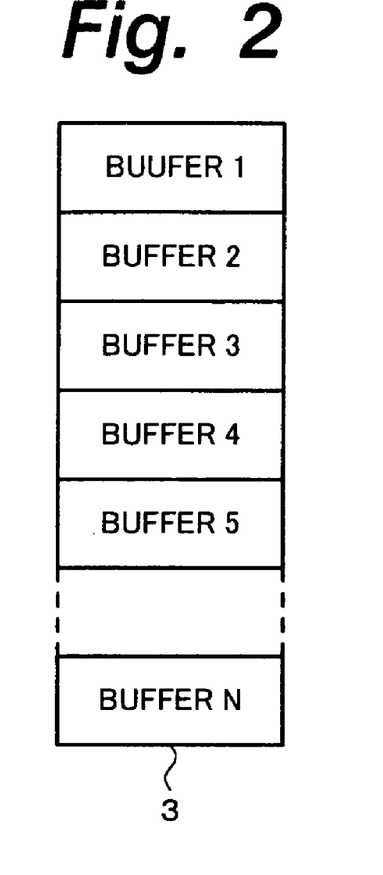
FIG. 2 is a diagram showing a construction of a video frame buffer 3 in FIG. 1.

As shown in FIG. 2, the video frame buffer 3 has the buffers 1 to N as areas for storing the video data of N frames. It is not always necessary to define those buffers into continuous address areas. Each buffer is used in order of the allocation for a decoding output, the holding of a decoding result, and the output of the data. The buffer in which the output has been finished is used again as a buffer for decoding output. Further, all of the buffers are equivalently used and are not used for an application in which a specific buffer is limited.

The output FIFO 4 can be also formed in the video frame buffer 3.

Figure 3:
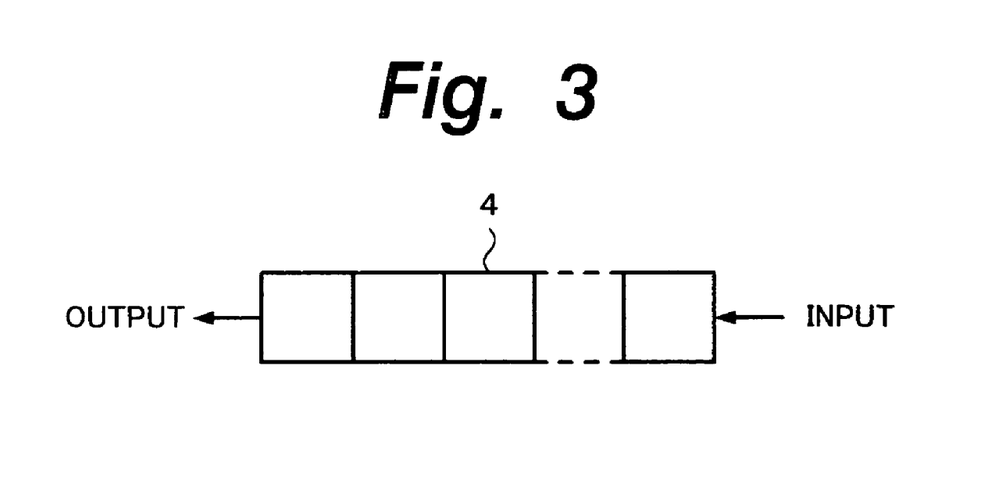
FIG. 3 is a diagram showing a construction of an output FIFO 4 in FIG. 1.

FIG. 3 shows a principled construction of the output FIFO 4. The output FIFO 4 manages the order of the buffers for outputting the decoding result and a delay that is caused before the output. Management IDs or pointers of the buffers 1 to N of the video frame buffer 3 shown in FIG. 2 are inputted and stored in the output FIFO 4 in the outputting order.

Figure 4:
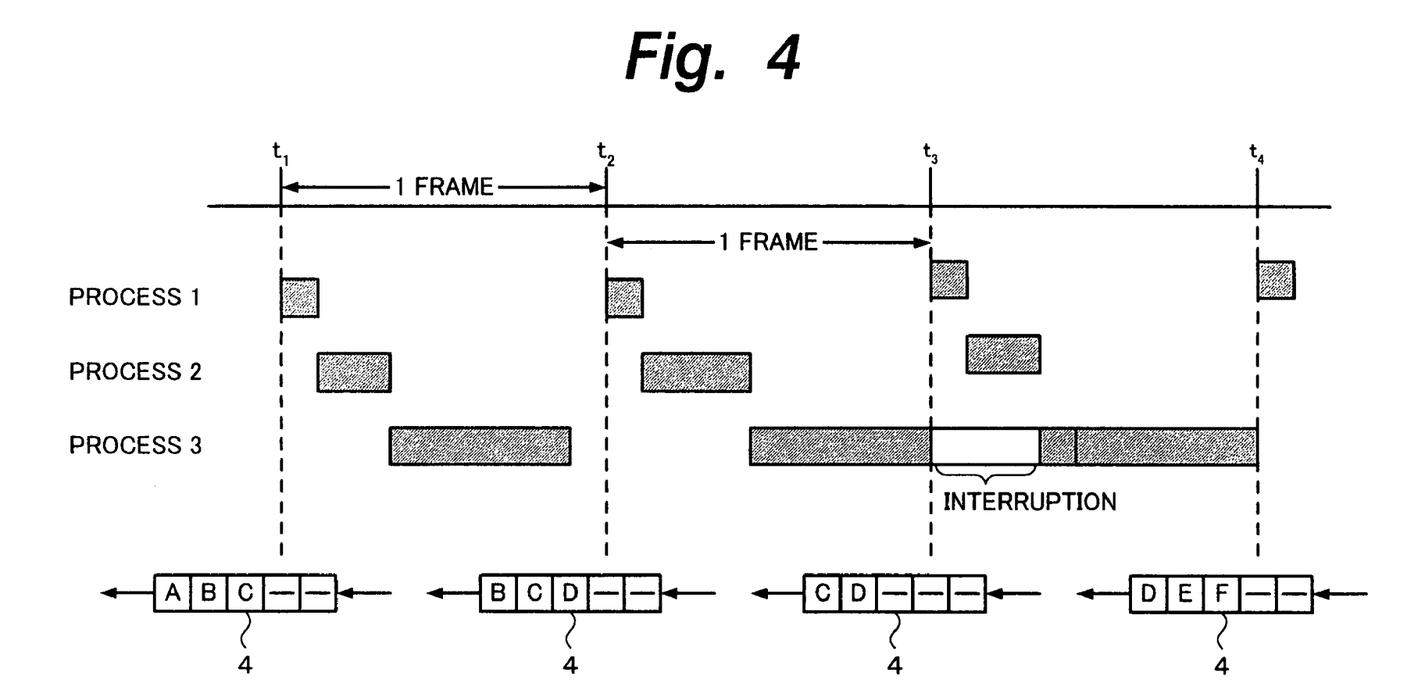
FIG. 4 is a timing chart for explaining the operation of the apparatus of FIG. 1.

The operation of the apparatus shown in FIG. 1 will now be described with reference to a timing chart of FIG. 4. In FIG. 4, each of time t1 to time t4 indicates a timing for outputting the decoded video data. That is, each interval between time t1 and time t4 is set to a period (33.36 msec) of one frame. The CPU 1 executes a process 1 at the timing of time t1 in accordance with a program read out from the program memory 2. When the process of the process 1 is finished, the CPU 1 subsequently executes a process 2. When the process of the process 2 is completed, the CPU 1 subsequently executes a process 3. In this manner, regarding the priorities of the processes, the process 1 is set to the highest priority, the process 2 is set to the second highest priority, and the process 3 is set to the lowest priority, respectively.

Figure 5:
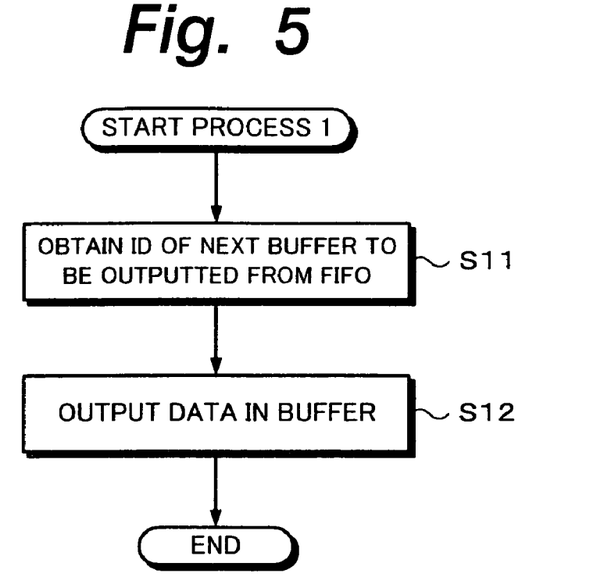
FIG. 5 is a flowchart for explaining the operation of a process 1 in FIG. 4.

The process 1 will now be described with reference to a flowchart of FIG. 5. In step S11, the CPU 1 obtains the ID of the buffer to which the data is outputted next from the output FIFO 4. In step S12, the CPU 1 reads out video data corresponding to the ID obtained in step S11 from the video frame buffer 3 and outputs it to the display controller 6 via the bus 7. The display controller 6 outputs the inputted data to the display (not shown) and allows it to be displayed.

For example, "A" has been held as a management ID at the head in the output FIFO 4 at time t1 shown in FIG. 4. In step S11, the CPU 1 reads out "A" as a management ID from the output FIFO 4, reads out the video data of the buffer corresponding to the management ID "A" among the buffers 1 to N in the video frame buffer 3, and outputs it.

The CPU 1 subsequently executes the process 2. For example, the process 2 is a decoding process of audio data. The processed audio data is generated from speakers (not shown) synchronously with a predetermined timing signal which is outputted from the display controller 6.

Figure 6:
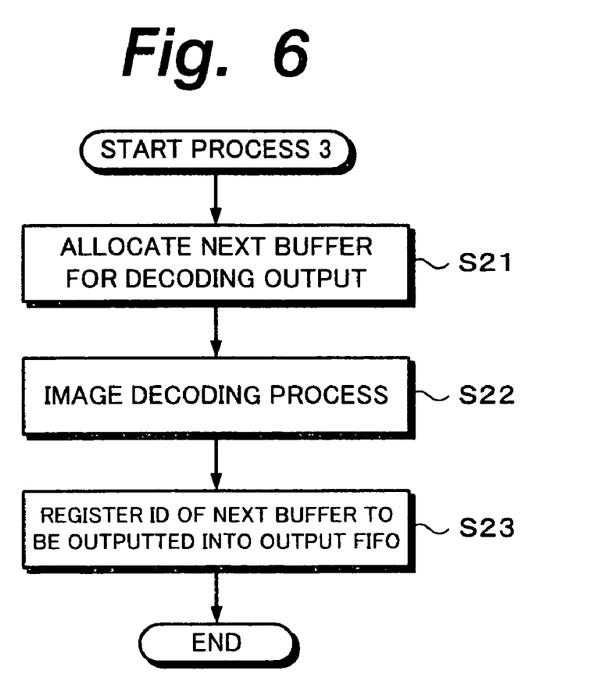
FIG. 6 is a flowchart for explaining the operation of a process 3 in FIG. 4.

When the process 2 is finished, the CPU 1 subsequently executes the process 3. The details of the process 3 will now be described with reference to a flowchart of FIG. 6.

First, in step S21, the CPU 1 executes an allocating process of the buffer for the next decoding output. That is, the empty buffer (which has already been read out) among the buffers 1 to N of the video frame buffer 3 shown in FIG. 2 is allocated as a buffer for storing the decoded video data. In next step S22, the CPU 1 decodes the video data of one frame inputted from the stream input interface 5 by the decoding program read out from the program memory 2 by the MPEG system. The decoded data is stored in the buffer allocated in step S21. Further, in step S23, the CPU 1 registers the ID of the buffer to be outputted (read out) next into the output FIFO 4.

At a timing between time t1 and time t2 in FIG. 4, the decoding process of the frame in which the management ID is set to D has been performed by the process 3. Therefore, the CPU 1 registers D as a management ID into the output FIFO 4. In the example of FIG. 4, the process 3 can be completed in a period of time from time t1 to time t2.

On the other hand, for a period of time from time t2 to time t3, after video data of a frame in which a management ID is set to B was outputted as a process 1, a process of the audio data or the like is executed as a process 2 and, after that, the process 3 is started. However, the process 3 cannot be completed for a period of time until time t4.

In such a case, hitherto, the image of the frame which has been outputted at just previous time t2 and whose management ID is set to B is outputted again at time t3. However, in the invention, after the process of the process 3 was temporarily interrupted at time t3, an image of the frame which has been stored in the output FIFO 4 and whose management ID is set to C is outputted as a process 1. Subsequently, after the process 2 was further executed, when it is finished, the process which was once interrupted is restarted as a process 3. After that, subsequently, a process of the video data of the next frame is executed. In the example of FIG. 4, the video data of two frames whose management IDs are set to E and F can be processed for a period of time from time t3 to time t4, and E and F as management IDs of those frames are stored in the output FIFO 4.

As mentioned above, by enabling the buffers 1 to N to be managed by the output FIFO 4, even in the case where the execution time of the process 3 temporarily exceeds the output period or in the case where the execution timings of the process 1 and process 3 become asynchronous due to the reduction and extension of the execution time of each process, the buffer to which the data is outputted at a predetermined period can be always assured in the process 1.

As mentioned above, the processing ability of the software that is required for the CPU 1 does not need to be made to correspond to the case where the processing time that is required for decoding of one frame becomes the longest time. It is sufficient to make it to correspond to the average processing time that is required for decoding of a few frames. Therefore, a cheaper processor can be used as a CPU 1.

Figure 7:
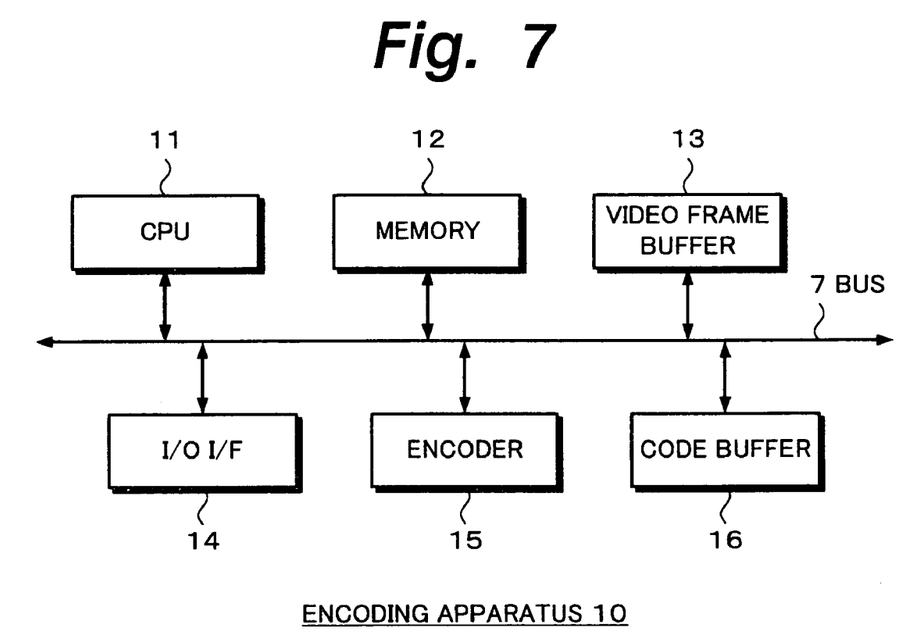
FIG. 7 is a block diagram showing a constructional example of a digital signal processing apparatus (encoder) to which the invention is applied.

A digital signal processing apparatus for encoding by the software process will now be described. FIG. 7 is a block diagram showing an internal construction of the digital signal processing apparatus to which the invention is applied. A CPU (Central Processing Unit) 11 executes predetermined processes in accordance with a program stored in a memory 12 comprising an ROM (Read Only Memory), an RAM (Random Access Memory), or the like. A video frame buffer 13 temporarily stores video data inputted via an input/output interface 14. An encoder 15 encodes the video data stored in the video frame buffer 13 and outputs it to a code buffer 16. The code buffer 16 temporarily stores the encoded video data. The video data stored in the code buffer 16 is outputted to another apparatus, for example, a recording apparatus (not shown) through the input/output interface 14. Those sections are mutually connected by a bus 17.

Figure 8:
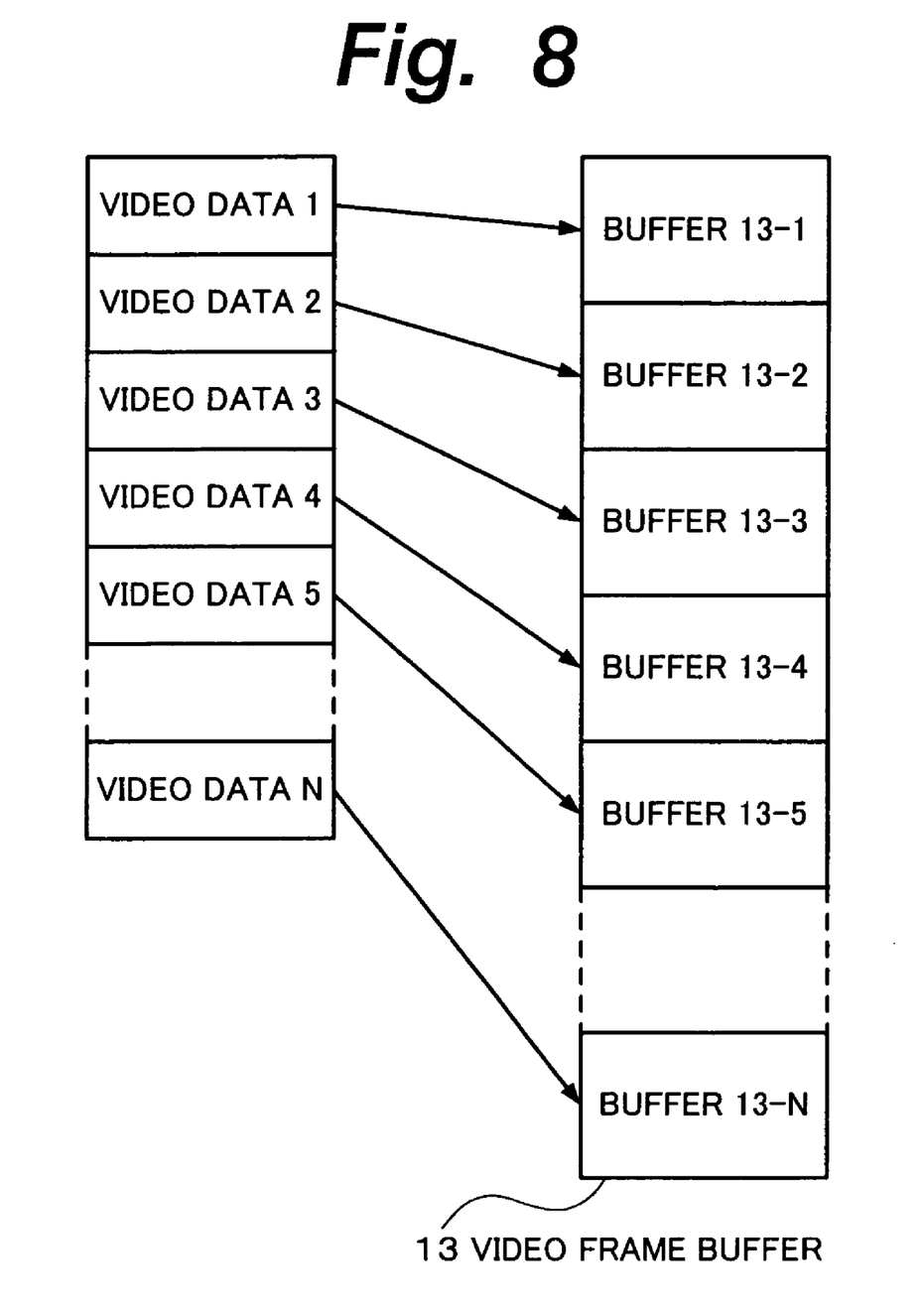
FIG. 8 is a diagram for explaining a video frame buffer 13.

The video frame buffer 13 has a capacity which can store video data of a plurality of frames and a plurality of buffers have been defined as shown in FIG. 8. That is, N buffers 13-1 to 13-N have been defined in the video frame buffer 13. Video data 1 is stored in the buffer 13-1, the video data 2 is stored in the buffer 13-2, and the video data N is stored in the buffer 13-N, respectively. The buffers 13-1 to 13-N are managed by IDs or pointers for unconditionally specifying them. Explanation will be made hereinbelow on the assumption that they are managed by the IDs. The buffers 1 to N are not always necessary to be defined in continuous address areas.

Figure 9:
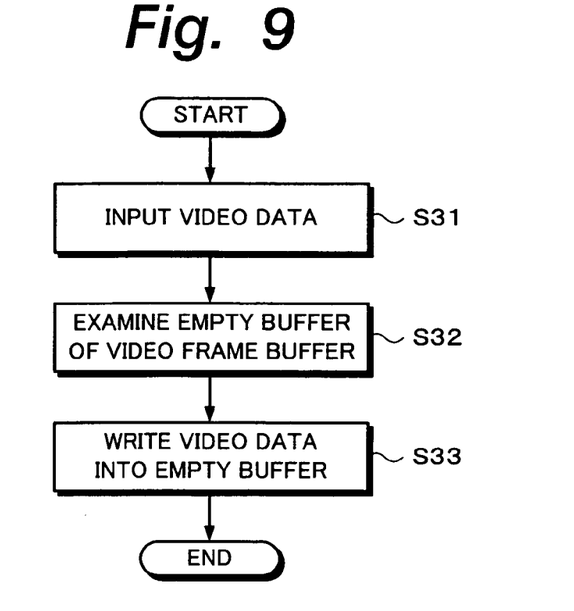
FIG. 9 is a flowchart for explaining a writing process of video data into the video frame buffer 13.

A writing process of the video data into the video frame buffer 13 which is executed by the CPU 11 will now be described with reference to a flowchart of FIG. 9. In step S31, when the video data is inputted to an encoding apparatus 10 through the input/output interface 14, the CPU 11 examines an empty buffer in the video frame buffer 13 in step S32. Each buffer in the video frame buffer 13 is managed by the ID which can be unconditionally specified. The CPU 11 examines the empty buffer by referring to the ID.

That is, for example, the IDs of the buffers in which the video data has been stored are sequentially written by using an FIFO (First In First Out) and by examining the ID which is not written in the FIFO, the empty buffer can be examined. In the case where each buffer in the video frame buffer 13 is managed by using the FIFO as mentioned above, the data is sequentially outputted in the writing order in a reading process, which will be explained hereinlater. Since the same ID is not written in the FIFO, the outputted ID (therefore, the ID which is not written in the FIFO) is the ID showing the empty buffer.

In step S33, the video data inputted in step S31 is written in the buffer examined to be the empty buffer in step S32. The video data written in this manner is read out when the encoding is performed by the encoder 15. The reading process will be described with reference to a flowchart of FIG. 10. When the video data has been stored in the video frame buffer 13 and the CPU 11 is not performing another process, an encoding amount in the case where the image of one frame stored in the video frame buffer 13 was encoded is predicted in step S41. The video data as a target of the encoding is video data stored in the buffer corresponding to the ID which has been written first in the FIFO at that time point.

Figure 10:
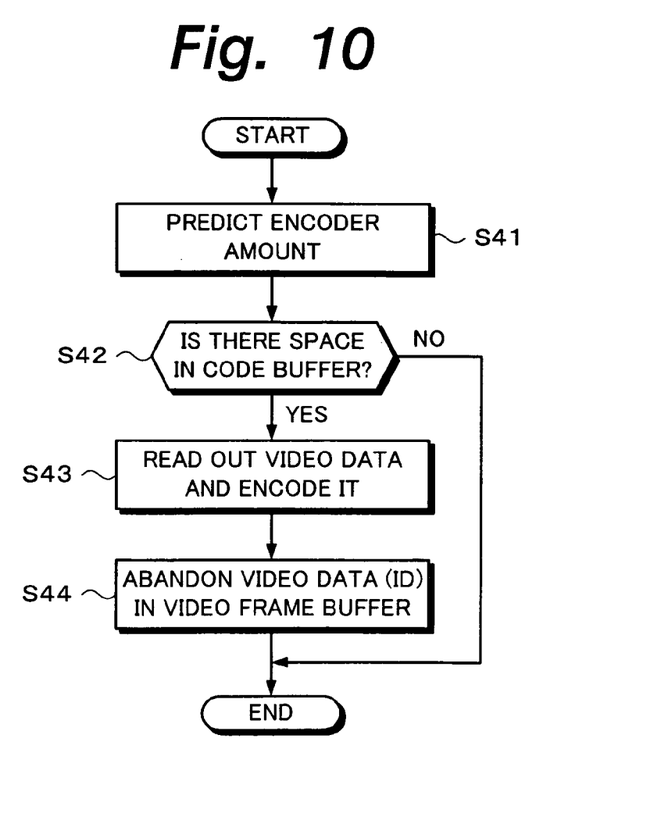
FIG. 10 is a flowchart for explaining an encoding.

When the encoding amount is predicted in step S41, whether the empty capacity enough to store the data of the encoding amount remains in the code buffer 16 or not is discriminated in step S42. If it is determined that the empty capacity enough to store the data of the predicted encoding amount does not exist in the code buffer 16, the encoded video data cannot be stored, so that the processes of this flowchart are finished.

If it is determined in step S42 that the capacity enough to store the data of the predicted encoding amount exists in the code buffer 16, step S43 follows. The video data whose encoding amount has been predicted in step S41 is read out from the video frame buffer 13 and encoded by the encoder 15. The video data encoded by the encoder 15 is stored in the code buffer 16. When the video data is stored in the code buffer 16, the video data encoded in step S43 is deleted from the video frame buffer 13 in step S44. At the same time, the ID of the buffer in the video frame buffer 13 in which the encoded video data has been stored is abandoned (outputted) from the FIFO.

The encoding by the encoder 15 is executed when the CPU 11 does not perform another process, when the video data has been stored in the video frame buffer 13, and when the empty capacity enough to store the encoded video data remains in the code buffer 16 as mentioned above.

Figure 11:
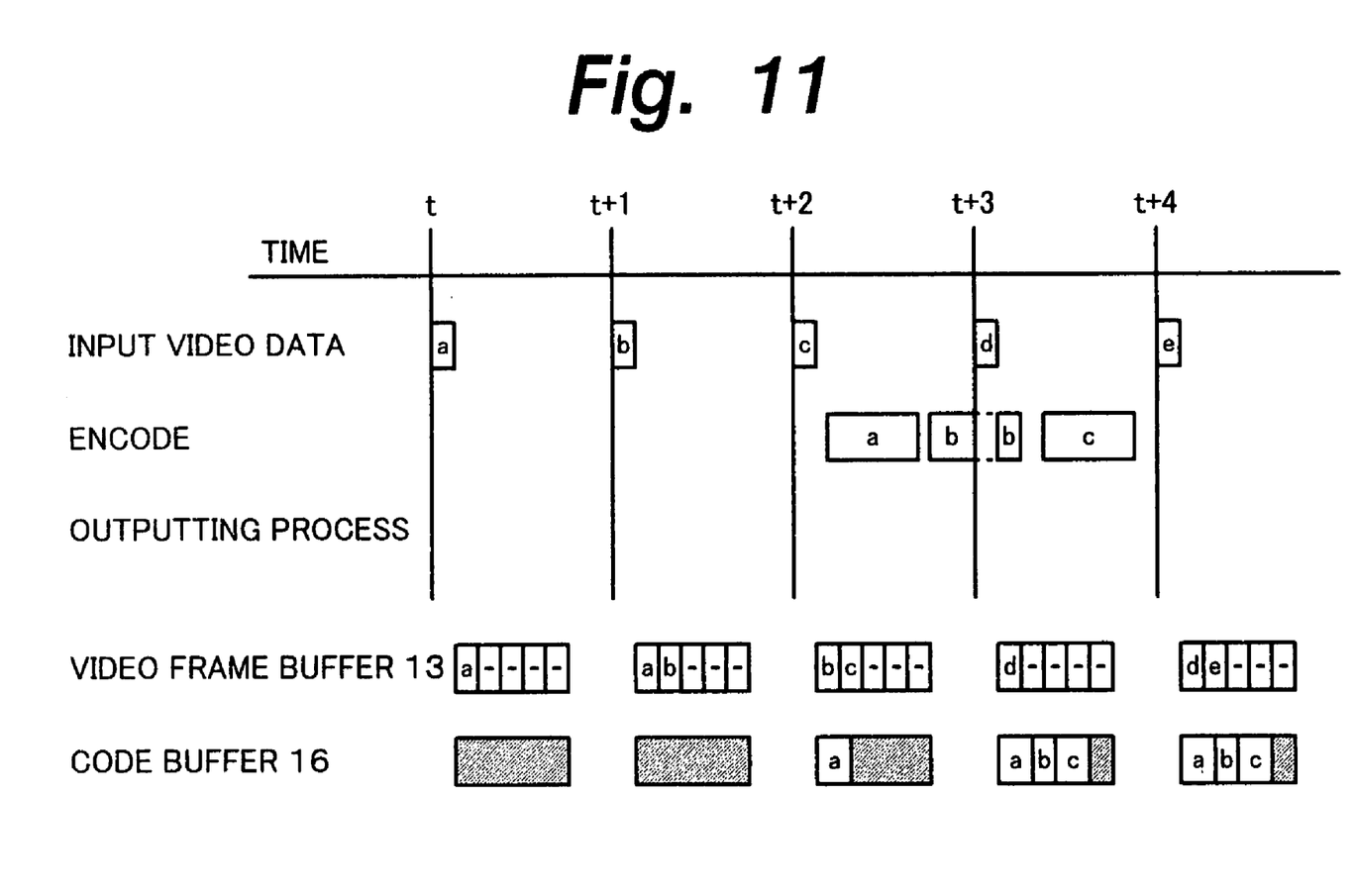
FIG. 11 is a diagram for explaining processes within a range from an input of the video data to an output.
Figure 12:
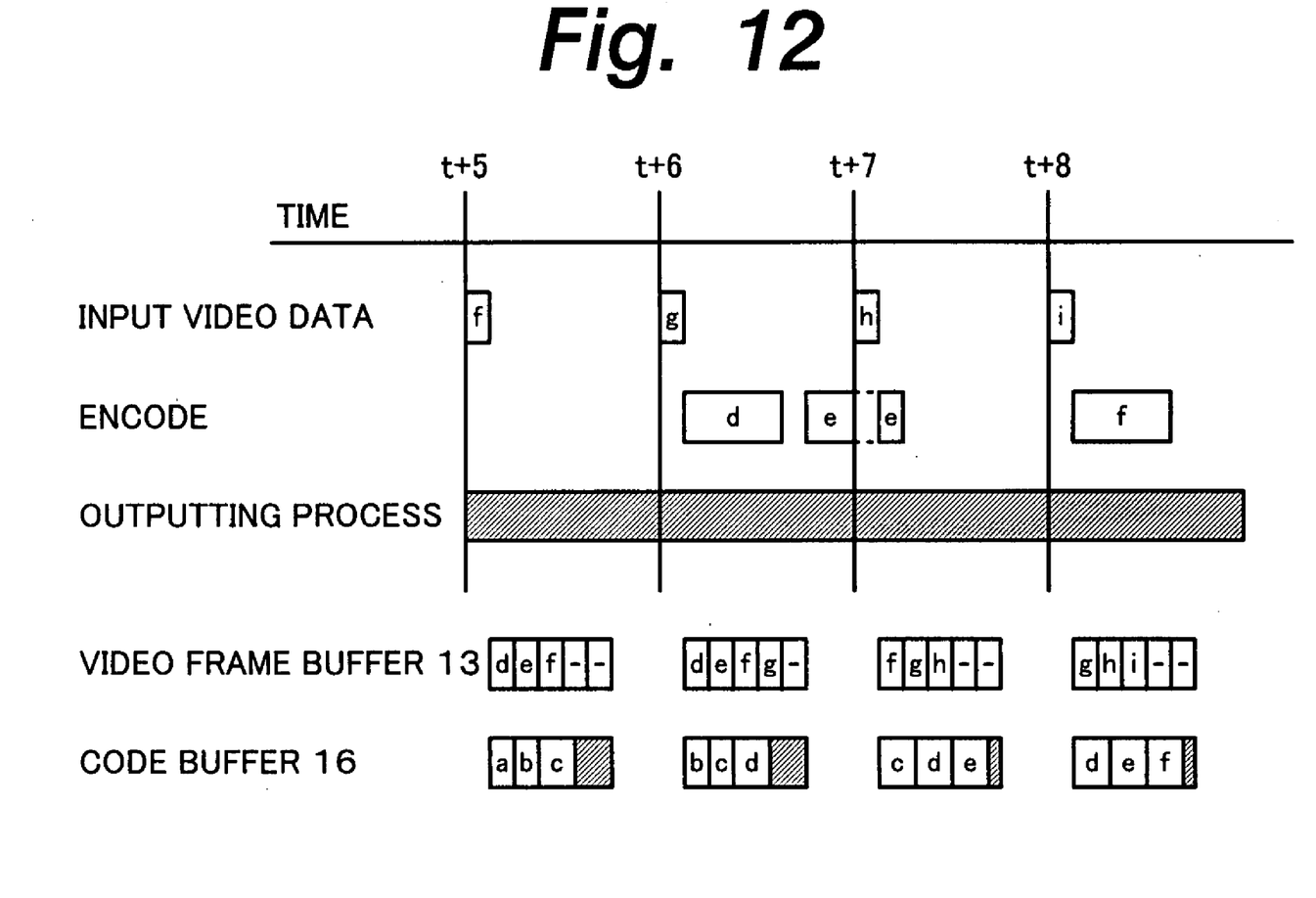
FIG. 12 is a diagram showing a sequel to FIG. 11.

A series of processes of the encoding apparatus 10 as mentioned above will be further explained with reference to FIGS. 11 and 12. When video data (a) is inputted to the encoding apparatus 10 at time t, the processes described with reference to the flowchart of FIG. 9 are executed. The inputted video data (a) is stored in the allocated buffer in the video frame buffer 13. When video data (b) is inputted at time t+1, the inputted video data (b) is stored in the allocated buffer in the video frame buffer 13 by a process similar to that in the case where the video data (a) is inputted. At time t+1, the process in step S41 in the flowchart of FIG. 4B is executed, namely, the encoding amount at the time of encoding the video data (a) is predicted with respect to the video data (a) stored in the video frame buffer 13. A time interval between time t and time t+1 is set to, for example, 33.36 msec in case of the NTSC system. The other time intervals are also the same as it.

When it is determined by the process in step S42 that the data of the encoding amount at the time when the video data (a) has been encoded can be stored in the code buffer 16, the encoding by the encoder 15 is started. In this case, since nothing is stored in the code buffer 16, it is determined that there is the empty capacity enough to store the encoded video data (a). When video data (c) is inputted and stored in the video frame buffer 13 at time t+2, the CPU 1 allows the encoder 5 to encode the video data (a). As a process in step S43, when the video data (a) is read out from the video frame buffer 13, encoded by the encoder 15, and stored in the code buffer 16, as a process in step S44, the video data (a) (ID corresponding to the buffer in which the video data (a) has been stored) stored in the video frame buffer 13 is deleted.

At time t+2, there is still a time until next time t+3 at a time point when the storage of the video data (c) and the encoding of the video data (a) are finished and an empty capacity enough to store the encoded video data (b) remains in the code buffer 16. Therefore, not only the encoding of the video data (a) but also the encoding of the video data (b) are started. However, when input time t+3 of video data (d) comes and the video data (d) is inputted during the encoding of the video data (b), the encoding of the video data (b) is interrupted while the video data (d) is being inputted (stored). When the input of the video data (d) is finished, the encoding of the video data (b) is restarted. The encoding of the video data (b) is finished and the encoding of the video data (c) is also completed until time t+4. Therefore, just before time t+4, a state where only the video data (d) newly inputted has been stored in the video frame buffer 13 is obtained, and a state where the video data (a), video data (b), and video data (c) which had already been encoded have been stored in the code buffer 16 is obtained.

As mentioned above, when the video data stored in the video frame buffer 13 is encoded, its encoding amount differs every video data. Therefore, even in the case where the time which is required for encoding also differs, there is no need to finish the process within a predetermined processing time (in the input period in which the video data is inputted), so that the encoding precision can be raised.

Video data (e) is inputted and stored in the video frame buffer 13 at time t+4. At this time point, since the video data (d) has already been stored in the video frame buffer 13 and the CPU 1 does not perform another process, it can execute the encoding process. However, since the empty capacity in the code buffer 16 is not enough, the encoding is not performed. Video data (f) is inputted at time t+5 (FIG. 12) and a predetermined amount of video data stored in the code buffer 16 is continuously outputted to another apparatus, for example, a recording apparatus or the like. In this output process, since it is sufficient that the CPU 11 instructs only the start of the reading process by providing a DMAC (Direct Memory Access Controller) or the like and allowing the data to be DMA transferred, the video data can be outputted without tasking the CPU 1 itself.

Since the video data stored in the code buffer 16 is outputted, an empty capacity is produced in the code buffer 16 itself. Therefore, the encoding is restarted at time t+6. After that, as described with reference to the flowcharts of FIGS. 9 and 10, the storing process to the video frame buffer 13 and the encoding process are similarly executed.

As mentioned above, the encoding process for one video data is executed in consideration of the empty capacity in the code buffer 6 and the empty time of the CPU 11, thereby enabling the encoding process to be performed without being restricted by a condition such that the process has to be finished within the input period of the video data. Thus, even if the processor (CPU 11) of the low processing ability is used in the encoding apparatus 10, the encoding can be performed at high precision and both of the input and the encoding of the video data can be performed.

A medium which is used for installing a program for executing the foregoing series of encoding or decoding processes into a computer and setting the program into a state where it can be executed by the computer will now be described with reference to FIG. 13.

Figure 13A:
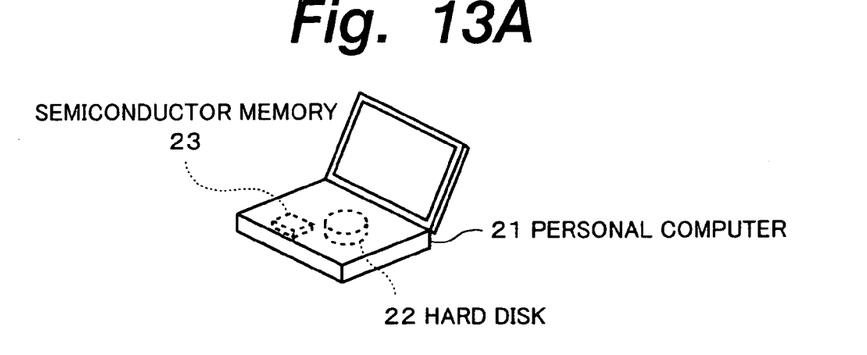
FIG. 13 is a diagram for explaining media.

As shown in FIG. 13A, the program can be provided for the user in a state where it has previously been installed in a hard disk 22 or a semiconductor memory 23 (corresponding to the memory 2) as a recording medium built in a personal computer 21.

Figure 13B:
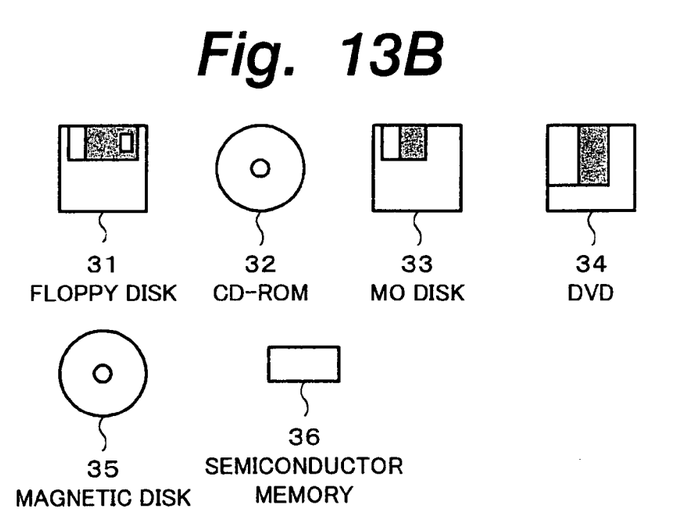

Otherwise, as shown in FIG. 13B, the program can be temporarily or permanently stored in a recording medium such as floppy disk 31, CD-ROM 32, MO disk 33, DVD 34, magnetic disk 35, semiconductor memory 36, or the like and provided as package software.

Figure 13C:
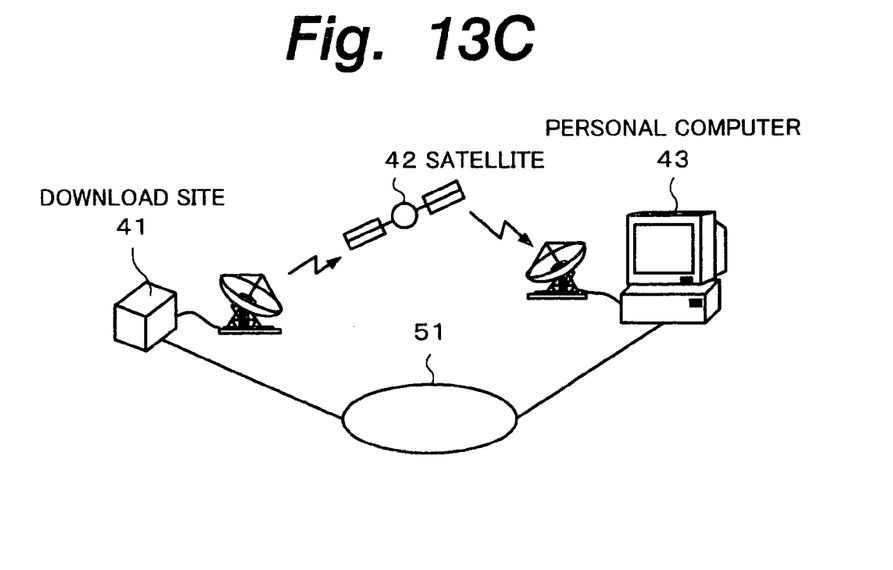

Further, as shown in FIG. 13C, the program can be transferred from a downloading site 41 to a personal computer 43 through a satellite 42 in a wireless manner, or can be transferred to the personal computer 43 in a wired or wireless manner through a network 51 such as local area network or Internet and can downloaded to a built-in hard disk or the like in the personal computer 43.

The "medium" in the specification denotes a broad concept including all of those media.

Although the access unit has been set to the frame in the above description, it can be also set to a field. Although the case of decoding the digital signal encoded by the MPEG system has been shown as an example, the encoding (compression) and its decoding (decompression) process can be also obviously performed by other systems.

As mentioned above, according to the digital signal processing apparatus according to claim 1, the digital signal processing method according to claim 3, and the providing medium according to claim 4, the stored outputting order of the digital signal of the access units is managed by the FIFO format. Therefore, the decoding process can be performed by an inexpensive apparatus while keeping the real-time performance by the software.

According to the digital signal processing apparatus according to claim 5, the digital signal processing method according to claim 6, and the medium acccording to another embodiment of the invention, the data amount at the time when the inputted video data is encoded is predicted, the video data is encoded, the encoded video data is stored, the encoding is performed when it is determined that the data of the predicted amount can be stored, and the encoding is interrupted while the video data is being inputted and processed. Therefore, the encoding can be performed at high precision even in case of using the processor of the low processing ability.

The invention is not limited to the foregoing embodiments or the like but many modifications and variations are possible within the scope of claims without departing from the spirit of the present invention.

The invention claimed is:

1. A digital signal processing method, comprising:
   inputting an encoded digital video signal and an encoded digital audio signal;
   accessing a decoding program for decoding the encoded digital video signal and the encoded digital audio signal from a program memory;
   executing the decoding program to decode the encoded digital video signal and the encoded digital audio signal in a decoding operation to thereby generate a decoded digital video signal and a decoded digital audio signal as a plurality of frames;
   storing the decoded digital video signal in a buffer as data corresponding to the plurality of frames;
   storing management data in a FIFO format, the management data indicating an output order of the plurality of frames; and
   controlling the decoding operation based on the output order of the plurality of frames;
   wherein decoding of the encoded digital audio signal is set to a higher priority than decoding of the encoded digital video signal; and
   wherein if the decoding operation on the encoded digital video signal is not completed within one frame period, the decoding operation is continued in the following frame period.

2. A computer readable storage medium storing a computer program for causing a digital video signal processing apparatus to execute a decoding operation, the program comprising:
   inputting an encoded digital video signal and an encoded digital audio signal;
   accessing a decoding program for decoding the encoded digital video signal and the encoded digital audio signal from a program memory;
   executing the decoding program to decode the encoded digital video signal and the encoded digital audio signal in the decoding operation to thereby generate a decoded digital video signal and a decoded digital audio signal as a plurality of frames;
   storing the decoded digital video signal in a buffer as data corresponding to a plurality of frames;
   storing management data in a FIFO format, the management data indicating an output order of the plurality of frames; and
   controlling the decoding operation based on the output order of the plurality of frames;
   wherein decoding of the encoded digital audio signal is set to a higher priority than decoding of the encoded digital video signal; and
   wherein if the decoding operation on the encoded digital video signal is not completed within one frame period, the decoding operation is continued in the following frame period.

3. A digital video signal processing apparatus, comprising:
   means for inputting an encoded digital video signal and an encoded digital audio signal;
   means for storing a decoding program for decoding the encoded digital video signal and the encoded digital audio signal;
   processing means operable to execute the stored decoding program to decode the encoded digital video signal and the encoded digital audio signal supplied from the inputting means and to generate a decoded digital video signal and a decoded digital audio signal as a plurality of frames in a decoding operation;

buffer means for storing the decoded digital video signal as data corresponding to the plurality of frames;

FIFO means for storing management data indicating an output order of the plurality of frames; and management means for controlling the decoding operation of the processing means based on the output order of the plurality of frames;

wherein the decoding for the encoded digital audio signal is set to a higher priority than the decoding for the encoded digital video signal; and wherein if the decoding operation on the encoded digital video signal is not completed within one frame period, the decoding operation is continued in the following frame period.

4. A digital signal processing apparatus according to claim 3, wherein the decoding program operates on the digital video signal according to an MPEG process.

5. The digital video signal processing apparatus of claim 3, wherein the buffer means comprises a plurality of buffer areas, and the management data indicating the output order of the plurality of frames comprises management identifiers of the plurality of buffer areas.

6. The digital video signal processing apparatus of claim 5, wherein the management data is stored in the FIFO means in the output order of the plurality of frames.

* * * * *